(12) United States Patent
Lu

(10) Patent No.: US 11,851,002 B2
(45) Date of Patent: Dec. 26, 2023

(54) SENSOR-FRIENDLY VEHICLE WARNING SIGN

(71) Applicant: Atieva, Inc., Newark, CA (US)

(72) Inventor: Qiang Lu, Foster City, CA (US)

(73) Assignee: Atieva, Inc., Newark, CA (US)

(*) Notice: Subject to any disclaimer, the term of this patent is extended or adjusted under 35 U.S.C. 154(b) by 0 days.

(21) Appl. No.: 17/444,544

(22) Filed: Aug. 5, 2021

(65) Prior Publication Data
US 2023/0044735 A1 Feb. 9, 2023

(51) Int. Cl.
*B60Q 7/02* (2006.01)
*B60Q 1/50* (2006.01)
*G09F 13/16* (2006.01)

(52) U.S. Cl.
CPC .............. *B60Q 7/02* (2013.01); *B60Q 1/525* (2013.01); *G09F 13/16* (2013.01)

(58) Field of Classification Search
CPC ............ B60Q 7/02; B60Q 1/525; G09F 13/16
See application file for complete search history.

(56) References Cited

U.S. PATENT DOCUMENTS

| | | |
|---|---|---|
| 4,440,104 A | 4/1984 | Bleiweiss et al. |
| 4,952,910 A | 8/1990 | Straten et al. |
| 5,031,347 A | 7/1991 | Berg |
| 5,301,446 A | 4/1994 | Kurtz |
| 5,355,117 A | 10/1994 | Jefferson |
| 6,057,785 A | 5/2000 | Guthrie |
| 6,275,149 B1 | 8/2001 | Tung |
| 6,696,126 B1 * | 2/2004 | Fischer .................. G02B 5/128 |
| | | 359/534 |
| 6,734,792 B1 | 5/2004 | Mcelveen |
| 7,101,056 B2 | 9/2006 | Pare |
| 9,931,978 B1 | 4/2018 | Chen |
| 10,160,381 B1 * | 12/2018 | Hernandez Covarrubias ............... |
| | | B60Q 7/005 |
| 11,175,400 B2 * | 11/2021 | Cohen ................ H01Q 15/0086 |
| 2008/0218329 A1 | 9/2008 | Fan et al. |
| 2015/0282254 A1 * | 10/2015 | Fritz ..................... B60R 1/0602 |
| | | 219/202 |
| 2016/0258595 A1 * | 9/2016 | Mossdorf .............. F24S 23/715 |
| 2020/0407968 A1 * | 12/2020 | Geringer ............... E04H 1/1205 |

FOREIGN PATENT DOCUMENTS

| | | | | |
|---|---|---|---|---|
| DE | 102007048709 B3 * | 7/2009 | .............. | B60Q 7/00 |
| DE | 102016008689 A1 | 2/2017 | | |
| KR | 101860389 B1 | 7/2018 | | |
| KR | 102109342 B1 * | 12/2020 | .............. | B60Q 7/00 |

OTHER PUBLICATIONS

International Search Report and Written Opinion for PCT Application No. PCT/US2022/074483, dated Nov. 11, 2022, 18 pages.
Voronov et al.: "Radar Reflecting Pavement Markers for Vehicle Automation", Astazero Researchers Day Symposium, Jan. 1, 2016, 8 pages.

* cited by examiner

*Primary Examiner* — Quan Zhen Wang
*Assistant Examiner* — Rajsheed O Black-Childress
(74) *Attorney, Agent, or Firm* — Brake Hughes Bellermann LLP

(57) ABSTRACT

A vehicle warning sign comprises: a reflective material for at least visible light; and at least one of (i) a heating element for detection by a thermal sensor or (ii) a corner reflector for detection by a radar, the corner reflector oriented substantially in a common direction with the reflective material.

5 Claims, 9 Drawing Sheets

SENSOR-FRIENDLY VEHICLE WARNING SIGN

TECHNICAL FIELD

This document relates to a sensor-friendly vehicle warning sign.

BACKGROUND

All vehicles are subject to becoming temporarily stopped along the roadway where they are traveling, whether such roadway be a street, avenue, road, highway, or freeway, to name just a few examples. The stop may occur because the driver chooses to halt the vehicle, or because of traffic blockage, or because the vehicle is involved in a collision or has an internal malfunction. Attempts have been made to reduce the risk posed by a vehicle stopped along the roadway. Such approaches have sought to make the stopped vehicle more visible to other drivers (e.g., by way of traditional warning triangles).

Today, an increasing number of vehicles on the roads are equipped with systems for various forms of assisted or autonomous driving using one or more types of sensors. However, the prior attempts at providing vehicle warning signs may not increase the likelihood of detection by the sensor(s) of a vehicle engaged in assisted or autonomous driving.

SUMMARY

In a first aspect, a vehicle warning sign comprises: a reflective material for at least visible light; and at least one of (i) a heating element for detection by a thermal sensor or (ii) a corner reflector for detection by a radar, the corner reflector oriented substantially in a common direction with the reflective material.

Implementations can include any or all of the following features. The reflective material comprises a retroreflector. The reflective material comprises a reflective coating. The reflective material comprises at least one of a metamaterial or a metasurface. The vehicle warning sign further comprises a light. The light is a flashing light. The vehicle warning sign comprises the heating element and the corner reflector. Respective geometric centers of the reflective material, the heating element and the corner reflector coincide with each other. The corner reflector is a collapsing corner reflector. The vehicle warning sign comprises at least the heating element and wherein the heating element is positioned around at least part of a periphery of the reflective material. The vehicle warning sign further comprises a support substrate, wherein the reflective material and the at least one of the heating element or the corner reflector is mounted to the support substrate. The vehicle warning sign further comprises a first hinge at the support substrate, wherein the reflective material and the at least one of the heating element or the corner reflector is mounted to the support substrate. The vehicle warning sign is configured to unfold from a stowed position to a deployed position. The support substrate comprises a first support substrate and a second support substrate, wherein the first hinge is mounted to one of the first or second support substrates, the vehicle warning sign further comprising a second hinge coupling the first and second support substrates to each other. The vehicle warning sign has a greater size in the deployed position than in the stowed position. The vehicle warning sign is configured to be flat against a vehicle bed in the stowed position, and to be oriented away from the vehicle bed in the deployed position. The vehicle warning sign is configured to hang from the first hinge in the deployed position. The vehicle warning sign is configured so that the reflective material and the at least one of the heating element or the corner reflector is detectable at both sides of the support substrate.

In a second aspect, a vehicle warning sign comprises: a support substrate; a reflective material for at least visible light, the reflective material applied to the support substrate; a heating element for detection by a thermal sensor, the heating element mounted to the support substrate; a corner reflector for detection by a radar, the corner reflector mounted to the support substrate and oriented substantially in a common direction with the reflective material; and a flashing light mounted to the support substrate and oriented substantially in the common direction with the reflective material.

In a third aspect, a vehicle warning sign comprises: a support substrate; a reflective material for at least visible light, the reflective material applied to the support substrate; first means for being detected by a thermal sensor, the first means applied to the support substrate; and second means for being detected by a radar, the second means applied to the support substrate.

BRIEF DESCRIPTION OF DRAWINGS

Like reference symbols in the various drawings indicate like elements.

DETAILED DESCRIPTION

Figure 1A:
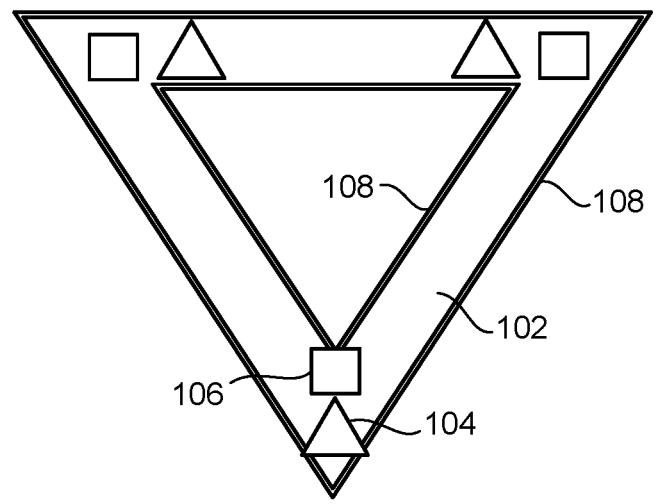
FIGS. 1A-1C show examples of vehicle warning signs.

This document describes examples of systems and techniques for providing sensor-friendly vehicle warning signs. A warning sign can include one or more features designed to increase the likelihood that the warning sign will be detected by a sensor of an oncoming vehicle, and/or to enable the sensor to detect the warning sign earlier. In some implementations, such a feature can be a heating element. For example, this can improve the likelihood that a thermal sensor of an approaching vehicle will detect the stopped vehicle in time to avoid a collision. In some implementations, such a feature can be a corner reflector. For example, this can improve the likelihood of detection by a radar of the approaching vehicle. Other features that can be included in a vehicle warning sign are described in examples below.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples herein refer to a reflective material. As used herein, a reflective material includes any material that reflects at least a portion of electromagnetic radiation (e.g., within the range of visible-light wavelengths). The reflection can be specular or diffuse. In some implementations, a reflective material can include beads of a transparent material acting like mirrors by way of being coated on one side with a material. For example, the transparent material can include glass beads partly coated by aluminum or another material. In some implementations, a reflective material can include a reflective coating. For example, a reflective coating can include a layered structure with a high-index material (e.g., having refractive index n greater than about 2) and a low-index material (e.g., having n smaller than about 1.5). In some implementations, a reflective material can include a retroreflector. A retroreflector can include a corner reflector, a cat's eye device, or a phase-conjugate mirror, to name just a few examples. In some implementations, a reflective surface can include a metamaterial and/or a metasurface. For example, the metamaterial can be made of one or more materials (including, but not limited to, metal or plastic) arranged in a repeating pattern at a scale smaller than the wavelength of the light to be reflected. As another example, the metasurface can have a sub-wavelength thickness.

Examples herein refer to a light. As used herein, a light includes any electric device that generates visible light from electric power. A light can be an incandescent light, a light-emitting diode (LED), or a fluorescent light, to name just a few examples.

Examples herein refer to a thermal sensor. As used herein, a thermal sensor includes any image sensor that detects electromagnetic radiation at least within the infrared radiation range. An infrared camera is an example of a thermal sensor. An infrared camera can register images at least within a wavelength range of about 700-14000 nanometers. For example, a thermal sensor can include a forward-looking infrared camera.

Examples herein refer to a camera for at least visible light. As used herein, a camera includes any device having an image sensor (e.g., a digital sensor) that detects electromagnetic radiation at least within the range of visible-light wavelengths.

Examples herein refer to a radar. As used herein, a radar includes any object detection system that is based at least in part on emitting and detecting radio waves.

Examples herein refer to an event-based sensor. An event camera is an example of an event-based sensor. As used herein, an event-based sensor includes any image sensor that registers pixel changes (e.g., differing brightness) between frames.

Examples herein refer to a LiDAR. As used herein, a LiDAR includes any object detection system that is based at least in part on light, wherein the system emits the light in one or more directions. The light can be generated by a laser and/or by an LED, to name just two examples. A LiDAR can be a scanning LiDAR or a non-scanning LiDAR (e.g., a flash LiDAR), to name just some examples.

Figure 1B:
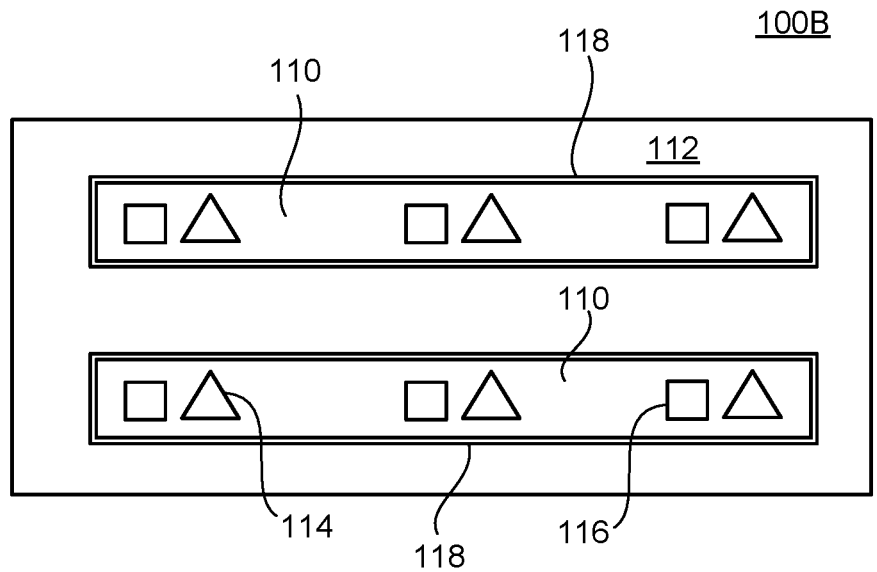
Figure 1C:
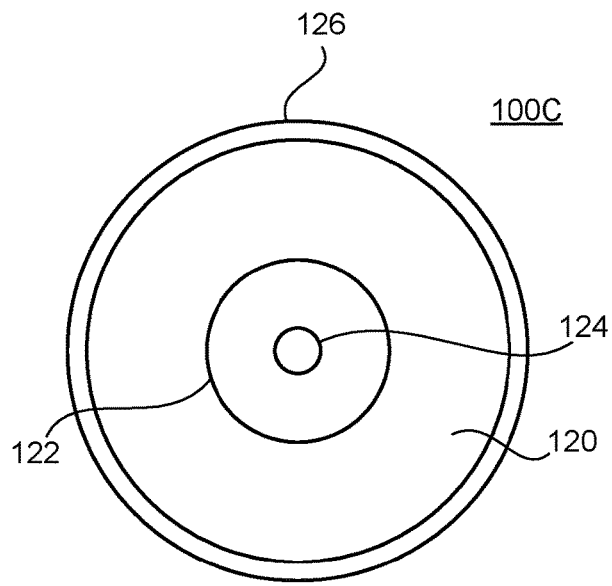

FIGS. 1A-1C show examples of vehicle warning signs 100A-100C. Any or all of the vehicle warning signs 100A-100C can be used with one or more other examples described elsewhere herein.

The vehicle warning sign 100A includes a reflective material 102. The reflective material 102 reflects at least visible light. In some implementations, the reflective material 102 can be shaped as a triangle. For example, the reflective material 102 can be applied to at least one side of a support substrate (e.g., any suitable backing material, including, but not limited to, plastic and/or metal).

The vehicle warning sign 100A includes at least one corner reflector 104 for detection by a radar (e.g., mounted on an approaching vehicle). The corner reflector 104 is here schematically represented using a triangle shape. For example, when a radar wave impinges on the corner reflector 104, the corner reflector 104 can reflect some or all of the radar wave, and the reflection can be detected as a radar signal.

The vehicle warning sign 100A includes at least one light 106. The light 106 emits at least visible light and is here schematically represented using a square shape. For example, the light 106 can be detected by a camera (e.g., a video camera) on an approaching vehicle. In some implementations, the light 106 can be a flashing light.

The vehicle warning sign 100A includes at least one heating element 108. The heating element 108 can include a wire that undergoes resistive heating upon passage of electric current. In some implementations, the heating element 108 is positioned around at least part of a periphery of the reflective material 102. For example, here the heating element 108 forms a border of the reflective material both on an outside and an inside of the triangular shape.

The vehicle warning sign 100B includes a reflective material 110. The reflective material 110 reflects at least visible light. In some implementations, the reflective material 110 can be shaped as one or more rectangular areas. For example, two rectangular areas of the reflective material 110 can be applied to at least one side of a support substrate 112 (e.g., any suitable backing material, including, but not limited to, plastic and/or metal).

The vehicle warning sign 100B includes at least one corner reflector 114 for detection by a radar (e.g., mounted on an approaching vehicle). For example, when a radar wave impinges on the corner reflector 114, the corner reflector 114 can reflect some or all of the radar wave, and the reflection can be detected as a radar signal.

The vehicle warning sign 100B includes at least one light 116. The light 116 emits at least visible light. For example, the light 116 can be detected by a camera (e.g., a video camera) on an approaching vehicle. In some implementations, the light 116 can be a flashing light.

The vehicle warning sign 100B includes at least one heating element 118. The heating element 118 can include a wire that undergoes resistive heating upon passage of electric current. In some implementations, the heating element 118 is positioned around at least part of a periphery of the reflective material 110. For example, here the heating element 118 forms a border of the reflective material on an outside of each of the rectangular areas.

The vehicle warning sign 100C includes a reflective material 120. The reflective material 120 reflects at least visible light. In some implementations, the reflective material 120 can be shaped as one or more circular areas. For example, a circular area of the reflective material 120 can be applied to at least one side of a support substrate (e.g., any suitable backing material, including, but not limited to, plastic and/or metal).

The vehicle warning sign 100C includes at least one corner reflector 122 for detection by a radar (e.g., mounted on an approaching vehicle). The corner reflector 122 here has an overall shape that is approximately circular. For example, when a radar wave impinges on the corner reflector 122, the corner reflector 122 can reflect some or all of the radar wave, and the reflection can be detected as a radar signal.

The vehicle warning sign 100C includes at least one light 124. The light 124 emits at least visible light. For example, the light 124 can be detected by a camera (e.g., a video camera) on an approaching vehicle. In some implementations, the light 124 can be a flashing light. The light 124 here has an overall shape that is approximately circular.

The vehicle warning sign 100C includes at least one heating element 126. The heating element 126 can include a wire that undergoes resistive heating upon passage of electric current. In some implementations, the heating element 126 is positioned around at least part of a periphery of the reflective material 120. For example, here the heating element 126 forms a border of the reflective material 120 on an outside of the circular area.

Each of the components of a vehicle warning sign can have a geometric center. For example, the reflective material 120 has a geometric center in the center of the circular shape; the corner reflector 122 has a geometric center in the center of the approximately circular shape; the light 124 has a geometric center in the center of the approximately circular shape; and the heating element 126 has a geometric center in the center of the reflective material 120. The respective geometric centers of two or more of these components can coincide with each other. For example, here all the respective geometric centers of the reflective material 120, the corner reflector 122, the light 124, and the heating element 126 coincide with each other. That is, multiple elements for different sensor modalities can have their geometric centers largely coinciding with each other. For example, this can facilitate a sensor fusion process by an oncoming vehicle so as to increase the probability of detection compared to using a single sensing modality. Other approaches can be used.

Two or more of the components of a vehicle warning sign can be oriented in a common direction. For example, the reflective material 102 is here oriented substantially in a common direction with the corner reflector 104, and the light 106. As another example, the reflective material 110 is here oriented substantially in a common direction with the corner reflector 114 and the light 116. As another example, the reflective material 120 is here oriented substantially in a common direction with the corner reflector 122 and the light 124. Other approaches can be used.

Figure 2A:
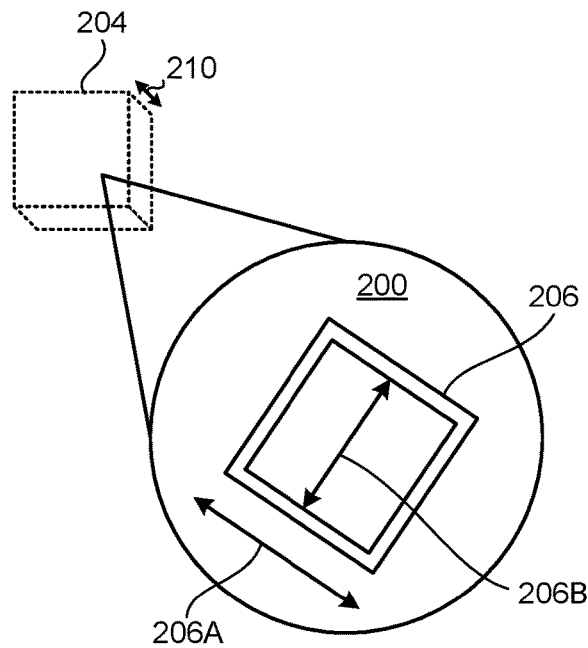
FIGS. 2A-2B show examples of metamaterials for a coating of a vehicle warning sign.
Figure 2B:
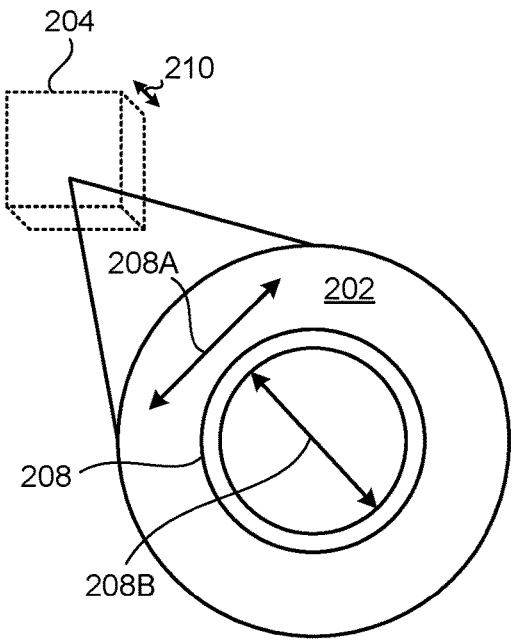

FIGS. 2A-2B show examples of metamaterials 200 and 202 for a coating of a vehicle warning sign. One or more of the metamaterials 200 and 202 can be used with one or more other examples described elsewhere herein.

Each of the metamaterials 200 and 202 is here shown as an enlargement of a portion of a coating 204. For example, the coating 204 is here schematically shown as a rectangular piece of material having a thickness. The coating 204 can be included in any reflective material described herein (e.g., in one or more of the reflective materials 102, 110, or 120 in FIGS. 1A-1C, respectively).

The metamaterials 200 and 202 have structures whose dimensions whose orders of magnitude are smaller than the wavelength of the light to be reflected. Here, the metamaterial 200 includes a rectangular shape 206. In some implementations, an exterior dimension 206A and/or an interior dimension 206B of the rectangular shape 206 can be smaller than at least one wavelength in the spectrum of visible light (e.g., a range of about 400-700 nanometers (nm)). In some implementations, the exterior dimension 206A and/or the interior dimension 206B can be smaller than at least one wavelength in the spectrum of infrared light (e.g., a range of about 700 nm-1 millimeter (mm)). In some implementations, the exterior dimension 206A and/or the interior dimension 206B can be smaller than at least one wavelength in the spectrum of microwave radiation (e.g., a range of about 1 mm to about 1 m). In some implementations, the exterior dimension 206A and/or the interior dimension 206B can be smaller than at least one wavelength in the spectrum of radio waves (e.g., a range of about 1 m to about 100 m).

Similarly, the metamaterial 202 here includes a circular shape 208. For example, an exterior dimension 208A and/or an interior dimension 208B of the circular shape 208 can be smaller than at least one wavelength in one or more of the ranges mentioned above with regard to the exterior dimension 206A and the interior dimension 206B. Other approaches can be used.

In some implementations, the coating 204 can include a metasurface instead of, or in addition to, the metamaterials 200 and/or 202. The coating 204 can have a sub-wavelength thickness 210. In some implementations, the sub-wavelength thickness 210 can be smaller than at least one wavelength in one or more of the ranges mentioned above with regard to the exterior dimension 206A and the interior dimension 206B. In some implementations, the sub-wavelength thickness 210 allows the coating 204 to manipulate the behavior of electromagnetic waves. For example, the metasurface can be structured or unstructured.

Figure 3A:
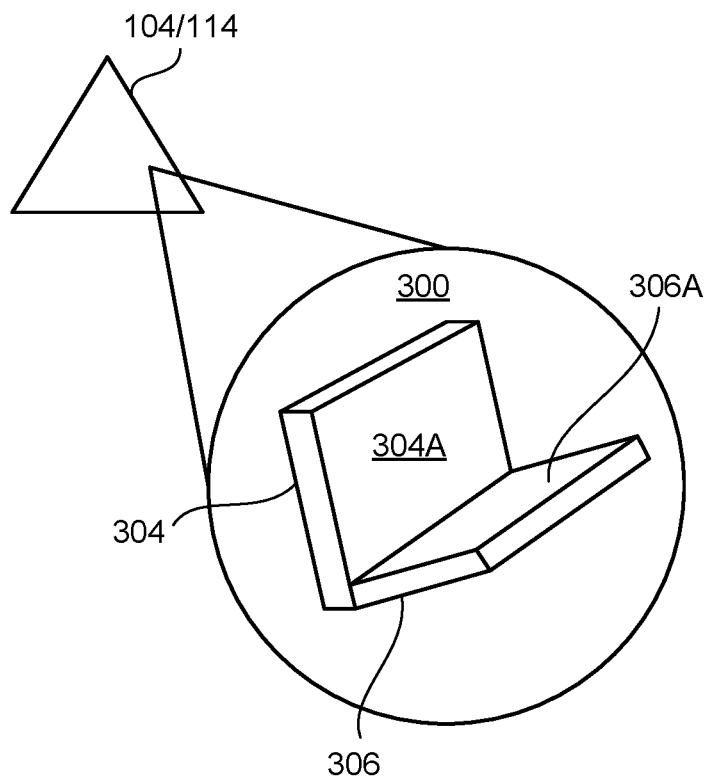
FIGS. 3A-3B show examples of corner reflectors for a vehicle warning sign.
Figure 3B:
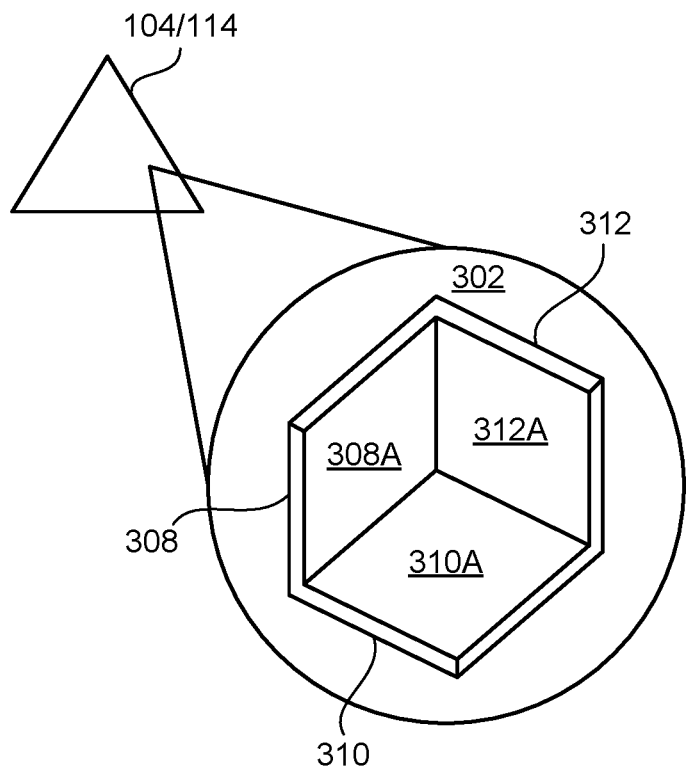

FIGS. 3A-3B show examples of corner reflectors 300 and 302 for a vehicle warning sign. One or more of the corner reflectors 300 and 302 can be used with one or more other examples described elsewhere herein.

Each of the corner reflectors 300 and 302 is here shown as an enlargement of the corner reflector 104 (FIG. 1A) or 114 (FIG. 1B). For example, the corner reflector 300 and/or 302 can be included in any vehicle warning sign described herein (e.g., in one or more of the vehicle warning signs 100A-100C in FIGS. 1A-1C, respectively).

The corner reflectors 300 and 302 have structures configured for reflection of incoming electromagnetic radiation (e.g., radar waves). Here, the corner reflector 300 includes a wall 304 forming at least one surface 304A. The corner reflector 300 also includes a wall 306 forming at least one surface 306A. The walls 304 and 306 are oriented so that an angle is formed between the surfaces 304A and 306A. For example, the corner reflector 300 can be referred to as having a dihedral structure design. Similarly, the corner reflector 302 here includes a wall 308 forming at least one surface 308A, a wall 310 forming at least one surface 310A, and a wall 312 forming at least one surface 312A. The walls 308-312 are oriented so that respective angles are formed between the surfaces 308A, 310A, and 312A. For example, the corner reflector 302 can be referred to as having a trihedral structure design. Other approaches can be used.

Either or both of the corner reflectors 300 and 302 can be a collapsible corner reflector. For example, with the corner reflector 300, the walls 304 and 306 can be mounted in a moveable fashion so that the angle between the surfaces 304A and 306A can be changed. As another example, with the corner reflector 302, the walls 308-312 can be mounted in a moveable fashion so that the angles between the surfaces 308A, 310A, and 312A can be changed. This can allow the corner reflector 300 and/or 302 to be flattened when not in use. For example, this can provide for a more compact vehicle warning sign (e.g., when stored inside a trunk or within a passenger compartment of the vehicle).

Figure 4A:
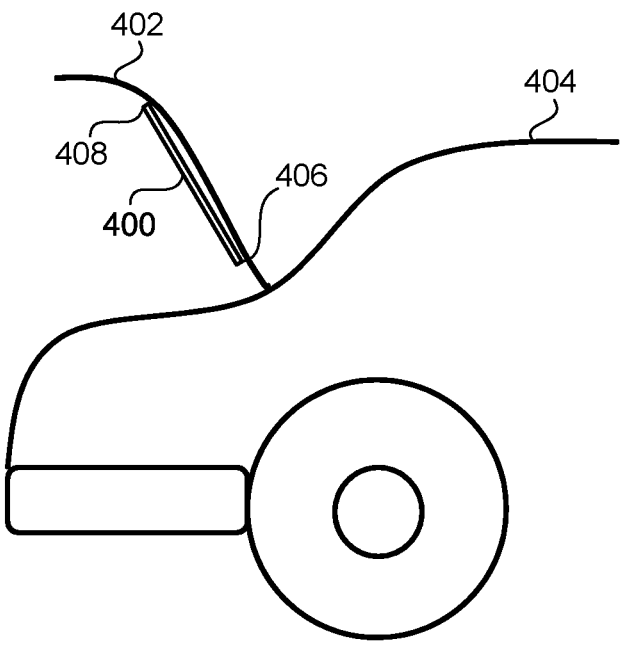
FIGS. 4A-4B show examples involving a vehicle warning sign and a trunk lid of a vehicle.
Figure 4B:
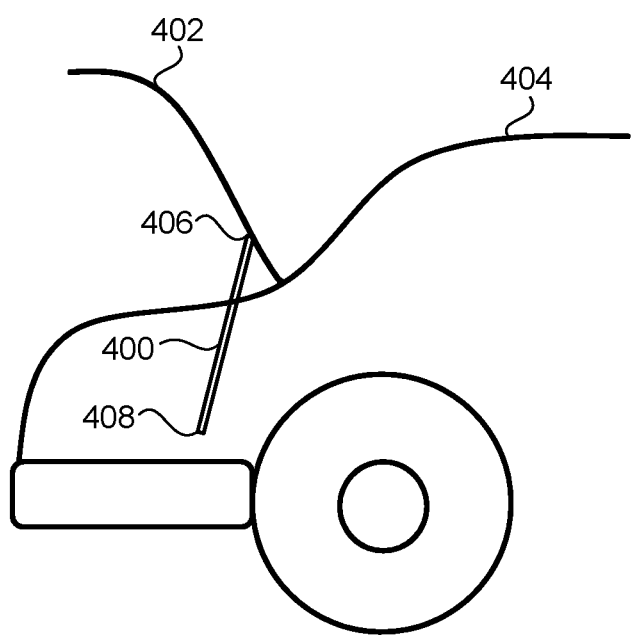

FIGS. 4A-4B show examples involving a vehicle warning sign 400 and a trunk lid 402 of a vehicle 404. Any or all of the vehicle warning sign 400 or the vehicle 404 can be used with one or more other examples described elsewhere herein. The vehicle 404 is here schematically illustrated in a side view and only part of the vehicle 404 is shown for simplicity. The rear of the vehicle 404, where the trunk lid 402 is positioned, is used for illustrative purposes only. In some implementations, the vehicle warning sign 400 can also or instead be used in one or more other areas of the vehicle 404, including, but not limited to, at a front of the vehicle 404 (e.g., at a hood or trunk lid).

The vehicle warning sign 400 is here shown in a side view. For example, the vehicle warning sign 400 can have a structure similar to any of the vehicle warning signs 100A-100C in FIGS. 1A-1C, respectively. The vehicle warning sign 400 can be coupled to an inside of the trunk lid 402 using at least one hinge 406. For example, the hinge 406 is here positioned at a bottom edge of the vehicle warning sign 400 in the orientation shown in FIG. 4A. An edge 408 of the vehicle warning sign 400 that is here opposite from the position of the hinge 406 can be releasably attached to the inside of the trunk lid 402. Any suitable attachment mechanism can be used, including, but not limited to, a magnet, a fastener, adhesive, or the like. As another example, the edge 408 can be inserted into an opening formed at the inside of the trunk lid 402. The orientation shown in FIG. 4A can be considered a stowed position.

The vehicle warning sign 400 can be exposed toward the rear of the vehicle 404 in the orientation shown in FIG. 4A. For example, when the trunk lid 402 is opened to a sufficiently large angle, and/or when the shape of the trunk lid 402 does not obscure the vehicle warning sign 400 as affixed to the inside of the trunk lid 402, this can allow the vehicle warning sign 400 to be detected in the orientation shown in FIG. 4A by one or more sensors of an approaching vehicle. In some implementations, the vehicle warning sign 400 can have one or more sensor-friendly features (e.g., one or more of the components described above with reference to any of FIGS. 1A-1C) on the side of the vehicle warning sign 400 that faces rearward in the vehicle in the orientation shown in FIG. 4A.

The edge 408 can be released from the inside of the trunk lid 402. This can allow the vehicle warning sign 400 to be pivoted (e.g., manually or by the force of gravity) about the hinge 406. For example, the vehicle warning sign 400 can assume the position shown in FIG. 4B, where the vehicle warning sign 400 hangs from the hinge 406. The orientation shown in FIG. 4B can be considered a deployed position. In a deployed position, an opposite side of the vehicle warning sign 400 is exposed toward the rear of the vehicle 404. This can allow the vehicle warning sign 400 to be detected in the orientation shown in FIG. 4B by one or more sensors of an approaching vehicle. In some implementations, the vehicle warning sign 400 can have one or more sensor-friendly features (e.g., one or more of the components described above with reference to any of FIGS. 1A-1C) on the side of the vehicle warning sign 400 that faces rearward in the vehicle in the orientation shown in FIG. 4B.

Figure 5A:
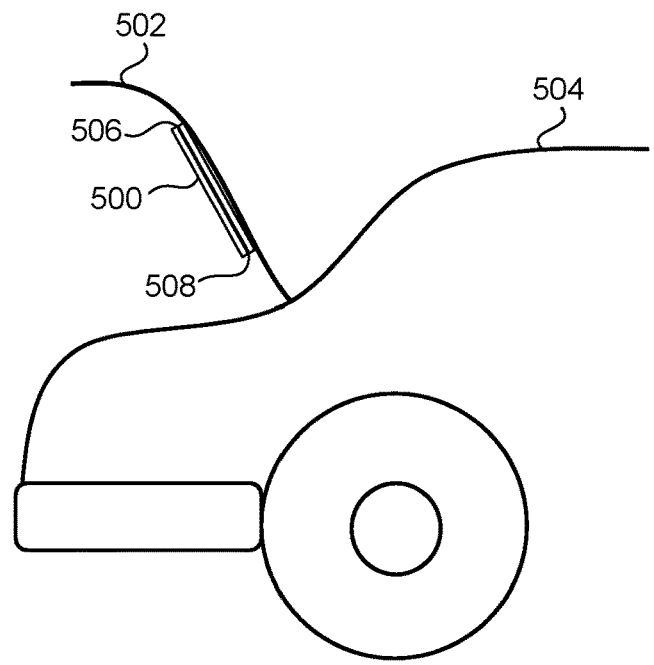
FIGS. 5A-5B show other examples involving a vehicle warning sign and a trunk lid of a vehicle.
Figure 5B:
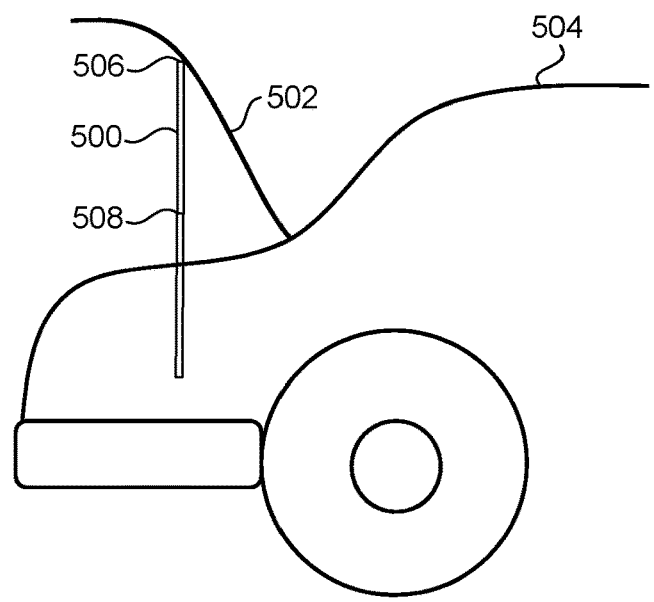

FIGS. 5A-5B show other examples involving a vehicle warning sign 500 and a trunk lid 502 of a vehicle 504. Any or all of the vehicle warning sign 500 or the vehicle 504 can be used with one or more other examples described elsewhere herein. The vehicle 504 is here schematically illustrated in a side view and only part of the vehicle 504 is shown for simplicity. The rear of the vehicle 504, where the trunk lid 502 is positioned, is used for illustrative purposes only. In some implementations, the vehicle warning sign 500 can also or instead be used in one or more other areas of the vehicle 504, including, but not limited to, at a front of the vehicle 504.

The vehicle warning sign 500 is here shown in a side view. For example, when deployed (e.g., as shown in FIG. 5B), the vehicle warning sign 500 can have an appearance similar to any of the vehicle warning signs 100A-100C in FIGS. 1A-1C, respectively. The vehicle warning sign 500 can be coupled to an inside of the trunk lid 502 using at least one hinge 506. For example, the hinge 506 is here positioned at a top edge of the vehicle warning sign 500 in the orientation shown in FIG. 5A. A hinge 508 is here positioned in an area of the vehicle warning sign 500 that is opposite from the position of the hinge 506. The hinge 508 couples two portions of the vehicle warning sign 500 to each other. In some implementations, the vehicle warning sign 500 can be based on a support substrate that holds one or more sensor-friendly features. For example, the hinge 508 can couple a first support substrate and a second support substrate to each other. The area of the vehicle warning sign 500 where the hinge 508 is positioned can be releasably attached to the inside of the trunk lid 502. Any suitable attachment mechanism can be used, including, but not limited to, a magnet, a fastener, adhesive, or the like. As another example, the area where the hinge 508 is positioned can be inserted into an opening formed at the inside of the trunk lid 502. The orientation shown in FIG. 5A can be considered a stowed position.

The vehicle warning sign 500 can be exposed toward the rear of the vehicle 504 in the orientation shown in FIG. 5A. For example, when the trunk lid 502 is opened to a sufficiently large angle, and/or when the shape of the trunk lid 502 does not obscure the vehicle warning sign 500 as affixed to the inside of the trunk lid 502, this can allow the vehicle warning sign 500 to be detected in the orientation shown in FIG. 5A by one or more sensors of an approaching vehicle. In some implementations, the vehicle warning sign 500 can have one or more sensor-friendly features (e.g., one or more of the components described above with reference to any of FIGS. 1A-1C) on the side of the vehicle warning sign 500 that faces rearward in the vehicle in the orientation shown in FIG. 5A.

The area of the vehicle warning sign 500 where the hinge 508 is positioned can be released from the inside of the trunk lid 502. This can allow the vehicle warning sign 500 to be unfolded (e.g., manually or by the force of gravity) by way of the hinges 506 and 508. For example, the vehicle warning sign 500 can assume the position shown in FIG. 5B, where the vehicle warning sign 500 hangs from the hinge 506. The orientation shown in FIG. 5B can be considered a deployed position. The vehicle warning sign 500 can have a greater size (e.g., facing toward a particular direction, such as rearward) in the deployed position than in the stowed position. In this deployed position, one side of the vehicle warning sign 500 is exposed toward the rear of the vehicle 504. This can allow the vehicle warning sign 500 to be detected in the orientation shown in FIG. 5B by one or more sensors of an approaching vehicle. In some implementations, the vehicle warning sign 500 can have one or more sensor-friendly features (e.g., one or more of the components described above with reference to any of FIGS. 1A-1C) on the side of the vehicle warning sign 500 that faces rearward in the vehicle in the orientation shown in FIG. 5B.

Figure 6A:
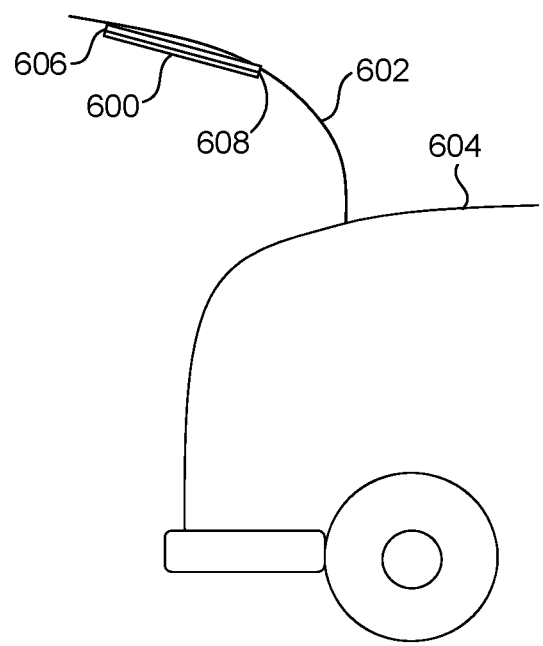
FIGS. 6A-6B show examples involving a vehicle warning sign and a liftgate of a vehicle.
Figure 6B:
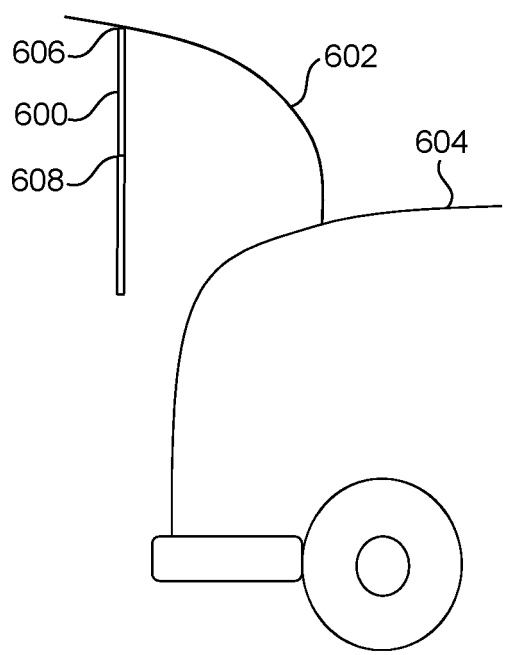

FIGS. 6A-6B show examples involving a vehicle warning sign 600 and a liftgate 602 of a vehicle 604. Any or all of the vehicle warning sign 600 or the vehicle 604 can be used with one or more other examples described elsewhere herein. The vehicle 604 is here schematically illustrated in a side view and only part of the vehicle 604 is shown for simplicity. The rear of the vehicle 604, where the liftgate 602 is positioned, is used for illustrative purposes only. In some implementations, the vehicle warning sign 600 can also or instead be used in one or more other areas of the vehicle 604, including, but not limited to, at a front of the vehicle 604.

The vehicle warning sign 600 is here shown in a side view. For example, when deployed (e.g., as shown in FIG. 6B), the vehicle warning sign 600 can have an appearance similar to any of the vehicle warning signs 100A-100C in FIGS. 1A-1C, respectively. The vehicle warning sign 600 can be coupled to an inside of the liftgate 602 using at least one hinge 606. For example, the hinge 606 is here positioned at a top edge of the vehicle warning sign 600 in the orientation shown in FIG. 6A. A hinge 608 is here positioned in an area of the vehicle warning sign 600 that is opposite from the position of the hinge 606. The hinge 608 couples two portions of the vehicle warning sign 600 to each other. In some implementations, the vehicle warning sign 600 can be based on a support substrate that holds one or more sensor-friendly features. For example, the hinge 608 can couple a first support substrate and a second support substrate to each other. The area of the vehicle warning sign 600 where the hinge 608 is positioned can be releasably attached to the inside of the liftgate 602. Any suitable attachment mechanism can be used, including, but not limited to, a magnet, a fastener, adhesive, or the like. As another example, the area where the hinge 608 is positioned can be inserted into an opening formed at the inside of the liftgate 602. The orientation shown in FIG. 6A can be considered a stowed position.

The vehicle warning sign 600 can be exposed toward the rear of the vehicle 504 in the orientation shown in FIG. 6A. For example, when the liftgate 602 is opened to a sufficiently large angle, and/or when the shape of the liftgate 602 does not obscure the vehicle warning sign 600 as affixed to the inside of the liftgate 602, this can allow the vehicle warning sign 600 to be detected in the orientation shown in FIG. 6A by one or more sensors of an approaching vehicle. In some implementations, the vehicle warning sign 600 can have one or more sensor-friendly features (e.g., one or more of the components described above with reference to any of FIGS. 1A-1C) on the side of the vehicle warning sign 600 that faces rearward in the vehicle in the orientation shown in FIG. 6A.

The area of the vehicle warning sign 600 where the hinge 608 is positioned can be released from the inside of the liftgate 602. This can allow the vehicle warning sign 600 to be unfolded (e.g., manually or by the force of gravity) by way of the hinges 606 and 608. For example, the vehicle warning sign 600 can assume the position shown in FIG. 6B, where the vehicle warning sign 600 hangs from the hinge 606. The orientation shown in FIG. 6B can be considered a deployed position. The vehicle warning sign 600 can have a greater size (e.g., facing toward a particular direction, such as rearward) in the deployed position than in the stowed position. In this deployed position, one side of the vehicle warning sign 600 is exposed toward the rear of the vehicle 604. This can allow the vehicle warning sign 600 to be detected in the orientation shown in FIG. 6B by one or more sensors of an approaching vehicle. In some implementations, the vehicle warning sign 600 can have one or more sensor-friendly features (e.g., one or more of the components described above with reference to any of FIGS. 1A-1C) on the side of the vehicle warning sign 600 that faces rearward in the vehicle in the orientation shown in FIG. 6B.

Figure 7A:
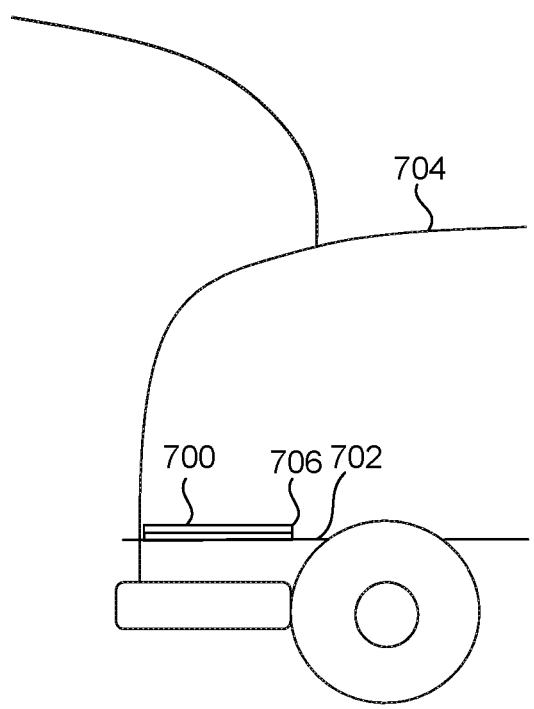
FIGS. 7A-7B show examples involving a vehicle warning sign and a bed of a vehicle.
Figure 7B:
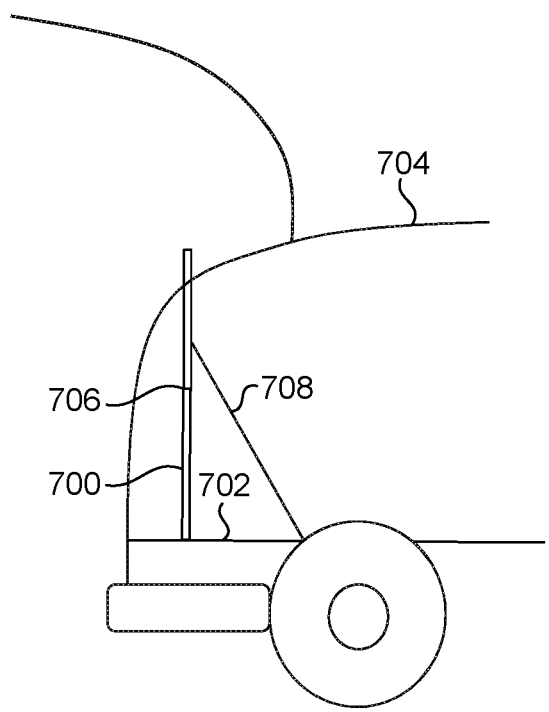

FIGS. 7A-7B show examples involving a vehicle warning sign 700 and a bed 702 of a vehicle 704. Any or all of the vehicle warning sign 700 or the vehicle 704 can be used with one or more other examples described elsewhere herein. The vehicle 704 is here schematically illustrated in a side view and only part of the vehicle 704 is shown for simplicity. The rear of the vehicle 704, where the bed 702 is positioned, is used for illustrative purposes only. In some implementations, the vehicle warning sign 700 can also or instead be used in one or more other areas of the vehicle 704, including, but not limited to, at a front of the vehicle 704. The bed 702 can be at least partially covered by a vehicle body (e.g., in a minivan or a sport utility vehicle), or the bed 702 can be part of a cargo space in a pickup truck, to name just a few examples.

The vehicle warning sign 700 is here shown in a side view. For example, when deployed (e.g., as shown in FIG. 7B), the vehicle warning sign 700 can have an appearance similar to any of the vehicle warning signs 100A-100C in FIGS. 1A-1C, respectively. The vehicle warning sign 700 can have at least one hinge 706. For example, the hinge 706 is here positioned in an area of the vehicle warning sign 700 that is situated forward in the position shown in FIG. 7A. The hinge 706 couples two portions of the vehicle warning sign 700 to each other. In some implementations, the vehicle warning sign 700 can be based on a support substrate that holds one or more sensor-friendly features. For example, the hinge 706 can couple a first support substrate and a second support substrate to each other. The vehicle warning sign 700 can be releasably attached to the bed 702. Any suitable attachment mechanism can be used, including, but not limited to, a magnet, a fastener, adhesive, or the like. The orientation shown in FIG. 7A can be considered a stowed position. In the stowed position, the vehicle warning sign 700 can be positioned flat against the bed 702.

The vehicle warning sign 700 can be at least partially released from the bed 702. This can allow the vehicle warning sign 700 to be unfolded (e.g., manually) by way of the hinge 706. For example, the vehicle warning sign 700 can assume the position shown in FIG. 7B, where the vehicle warning sign 700 is oriented away from the bed 702. The orientation shown in FIG. 7B can be considered a deployed position. The vehicle warning sign 700 can have a greater size (e.g., facing toward a particular direction, such as rearward) in the deployed position than in the stowed position. In this deployed position, one side of the vehicle warning sign 700 is exposed toward the rear of the vehicle 704. This can allow the vehicle warning sign 700 to be detected in the orientation shown in FIG. 7B by one or more sensors of an approaching vehicle. In some implementations, the vehicle warning sign 700 can have one or more sensor-friendly features (e.g., one or more of the components described above with reference to any of FIGS. 1A-1C) on the side of the vehicle warning sign 700 that faces rearward in the vehicle in the orientation shown in FIG. 7B. A support 708 can be provided for maintaining the vehicle warning sign 700 in the deployed position. For example, the support 708 can bear against the bed 702 and/or another portion of the body of the vehicle 704.

Figure 8A:
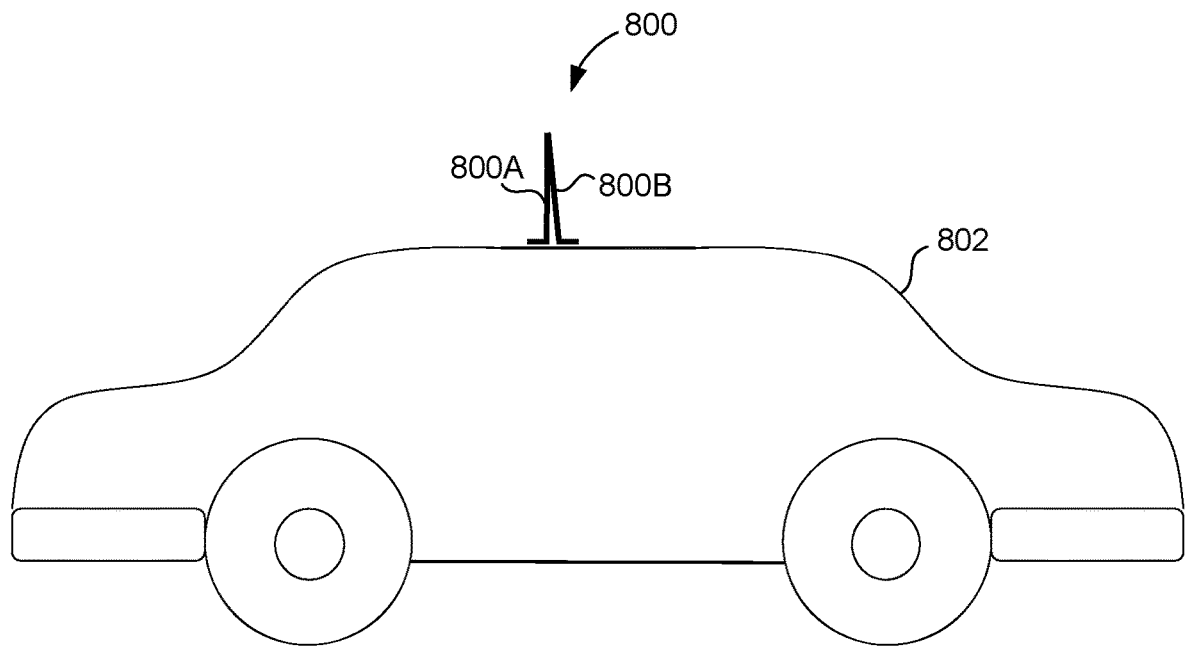
FIG. 8A shows an example involving a vehicle warning sign and a vehicle.

FIG. 8A shows an example involving a vehicle warning sign 800 and a vehicle 802. Any or all of the vehicle warning sign 800 or the vehicle 802 can be used with one or more other examples described elsewhere herein. The vehicle 802 is here schematically illustrated in a side view and only some portions of the vehicle 704 are shown for simplicity.

The vehicle warning sign 800 is here shown in a side view. For example, when viewed from the front or the rear of the vehicle 802, the vehicle warning sign 800 can have an appearance similar to any of the vehicle warning signs 100A-100C in FIGS. 1A-1C, respectively. The vehicle warning sign 800 can include support substrates 800A and 800B. The support substrates 800A-800B are coupled to each other. The vehicle warning sign 800 can be releasably attached to the vehicle 802, including, but not limited to, at the roof of the vehicle 802 and/or on a hood or trunk lid, or at a side of the vehicle 802. Any suitable attachment mechanism can be used, including, but not limited to, a magnet, a fastener, adhesive, or the like. This can allow the vehicle warning sign 800 to be detected by one or more sensors of an oncoming vehicle, whether that vehicle is approaching the vehicle 802 from the front or the rear. In some implementations, the vehicle warning sign 800 can have one or more sensor-friendly features (e.g., one or more of the components described above with reference to any of FIGS. 1A-1C) on each of the support substrates 800A-800B. In some implementations, the support substrates 800A-800B can form a single support substrate having sensor-friendly features on both of its sides. The vehicle warning sign 800 can be powered in any of multiple ways. In some implementations, the vehicle warning sign 800 can be powered by the vehicle 802 (e.g., by way of an electric cable to the vehicle's low-voltage power supply). In some implementations, the vehicle warning sign 800 can include a power supply (e.g., a rechargeable or non-rechargeable battery), so as to be a stand-alone device.

Figure 8B:
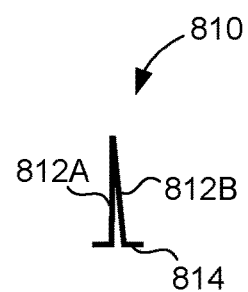
FIG. 8B shows an example of a portable vehicle warning sign.

FIG. 8B shows an example of a portable vehicle warning sign 810. The portable vehicle warning sign 810 can be used with one or more other examples described elsewhere herein. The portable vehicle warning sign 810 is here shown in a side view. For example, when viewed from the front or the rear, the portable vehicle warning sign 810 can have an appearance similar to any of the vehicle warning signs 100A-100C in FIGS. 1A-1C, respectively. The portable vehicle warning sign 810 can include support substrates 812A and 812B. The support substrates 812A-812B are coupled to each other. The portable vehicle warning sign 810 can have at least one base 814. The base 814 can be made of one or more material (e.g., the same as the support substrates 812A-812B), including, but not limited to, metal and/or a plastic material. The base 814 can allow the portable vehicle warning sign 810 to be placed in a variety of locations. The portable vehicle warning sign 810 can be placed on a roadway, on a road shoulder, on a curb, on a road fence or other barrier, and/or on top of, or inside a vehicle, to name just a few examples. The portable vehicle warning sign 810 can be powered in any of multiple ways. In some implementations, the portable vehicle warning sign 810 can be powered by the vehicle (e.g., by way of an electric cable to the vehicle's low-voltage power supply). In some implementations, the portable vehicle warning sign 810 can include a power supply (e.g., a rechargeable or non-rechargeable battery), so as to be a stand-alone device.

Figure 9:
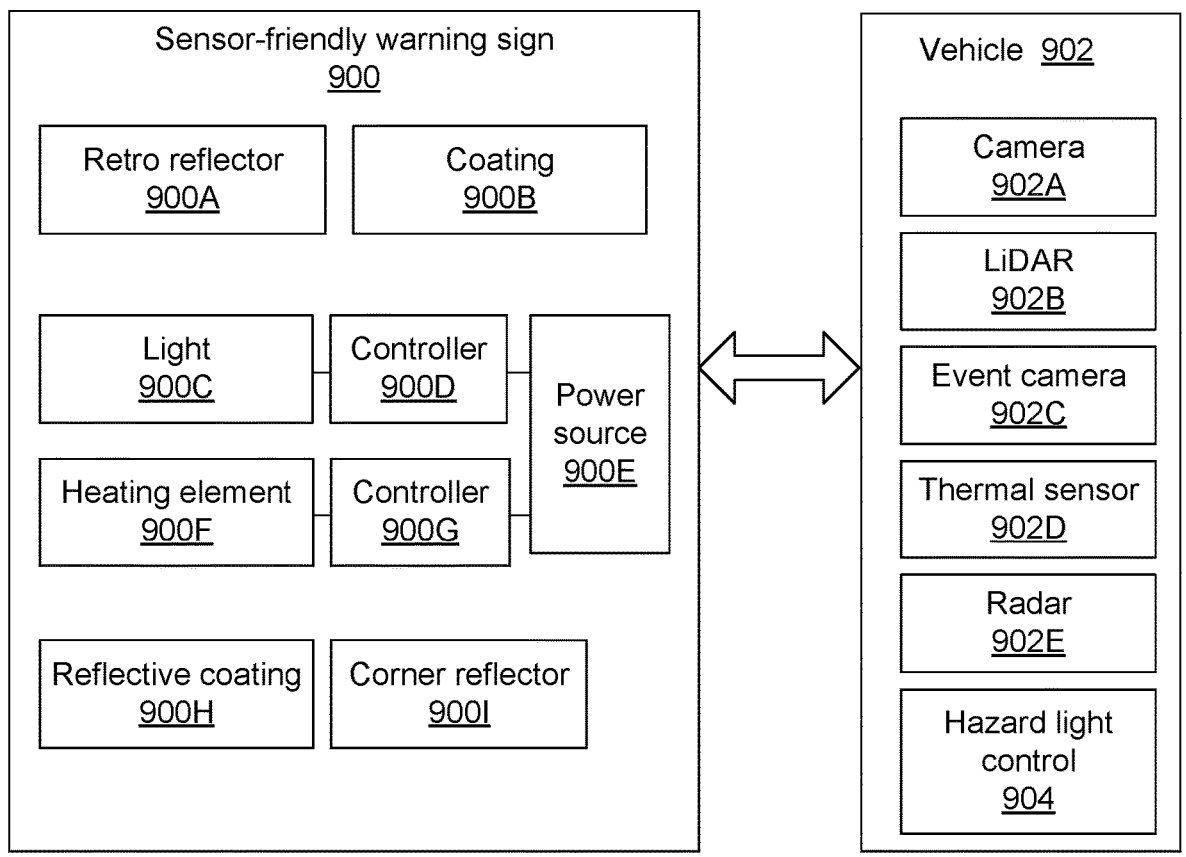
FIG. 9 shows an example of a block diagram of a vehicle warning sign.

FIG. 9 shows an example of a block diagram of a vehicle warning sign 900. The vehicle warning sign 900 can be used with one or more other examples described elsewhere herein. The vehicle warning sign 900 can be configured for use with a vehicle (not shown), along the lines of examples described above. Here, a vehicle 902 is a potentially oncoming vehicle. In some implementations, one or more sensor-friendly features of the vehicle warning sign 900 can increase the likelihood that a sensor of the vehicle 902 will detect the vehicle warning sign 900.

The vehicle warning sign 900 can include a retroreflector 900A. The retroreflector 900A can be planar (e.g., substantially two-dimensional) or can have a three-dimensional shape. For example, the retroreflector 900A can be detected by a camera 902A (e.g., a video camera) and/or by a LiDAR 902B of the vehicle 902.

The vehicle warning sign 900 can include a coating 900B. The coating 900B can be applied to a planar surface (e.g., substantially two-dimensional) or can be applied to a three-dimensional surface. In some implementations, the coating 900B includes one or more metamaterials and/or metasurfaces. For example, the coating 900B can be detected by the LiDAR 902B of the vehicle 902.

The vehicle warning sign 900 can include a light 900C. The light 900C can be regulated by a controller 900D and can receive electric power from a power source 900E. In some implementations, the power source 900E can include a battery (e.g., disposable or rechargeable) and/or a vehicle power system (e.g., a low-voltage power supply from the vehicle 902). In some implementations, the controller 900D can include a switch that turns the light 900C on and off. The controller 900D can activate the light 900C in a repeated pattern as a flashing light. For example, the light 900C can be detected by an event camera 902C of the vehicle 902.

The vehicle warning sign 900 can include a heating element 900F. The heating element 900F can be regulated by a controller 900G and can receive electric power from the power source 900E. In some implementations, the heating element 900F can include one or more wires that emit thermal energy upon receiving electric power. For example, the heating element 900F can be detected by a thermal sensor 902D of the vehicle 902.

The vehicle warning sign 900 can include a reflective coating 900H. The reflective coating 900H can be applied to a planar surface (e.g., substantially two-dimensional) or can be applied to a three-dimensional surface. For example, the reflective coating 900H can be detected by the camera 902A of the vehicle 902.

The vehicle warning sign 900 can include a corner reflector 900I. The corner reflector 900I can include a dihedral structure and/or a trihedral structure, to name just two examples. As another example, the corner reflector 900I can be a collapsing corner reflector. In some implementations, the corner reflector 900I can be detected by a radar 902E of the vehicle 902.

In some implementations, the vehicle 902 includes hazard lights (e.g., the familiar operation of the vehicle's turn signals where the right-side and left-side blinkers are flashing synchronously). The hazard-lights operating mode can be manually activated and deactivated using a hazard light control 904. For example, the hazard light control 904 can be actuated using a button in the passenger compartment. One or more components of the vehicle warning sign 900 can be automatically activated upon the hazard-lights operating mode being active. For example, control signals for one or more active elements of the vehicle warning sign 900 can be integrated with the hazard light control 904.

In some implementations, one or more components of the vehicle warning sign 900 can instead or additionally be automatically activated in another way. For example, when the vehicle 902 detects a flat tire or the deployment of an airbag, the vehicle 902 can actuate the active element(s) of the vehicle warning sign 900.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A sensor-friendly vehicle warning sign having features designed to increase a likelihood of, or enable earlier, detection of the sensor-friendly vehicle warning sign by a sensor of an oncoming vehicle, the sensor-friendly vehicle warning sign comprising:
   a retroreflector having a planar or a three-dimensional shape;
   a coating applied to a planar surface, the coating including one or more metamaterials or metasurfaces;
   a power source;
   a light powered by the power source;
   a first controller regulating the light, the first controller receiving electric power from the power source, the first controller including a switch that turns the light on and off in a repeated pattern;
   a heating element powered by the power source, the heating element including one or more wires that emit thermal energy upon receiving electric power;
   a second controller regulating the heating element, the second controller receiving electric power from the power source;
   a reflective coating having a triangular shape, the reflective coating including a reflective material applied to a planar surface or a three-dimensional surface, the reflective material including beads of a transparent material acting like mirrors by way of being coated with a material, wherein the heating element is positioned around at least part of a periphery of the reflective material such that the heating element forms a border of the reflective material both on an outside and an inside of the triangular shape; and
   a corner reflector including a dihedral structure or a trihedral structure, wherein the reflective material is oriented substantially in a common direction with the corner reflector and the light;
   wherein respective geometric centers of each of the light, the heating element, the reflective material, and the corner reflector coincide with each other.

2. The sensor-friendly vehicle warning sign of claim 1, wherein the sensor-friendly vehicle warning sign includes a support substrate, and wherein rectangular areas of the reflective material are applied to at least one side of the support substrate.

3. The sensor-friendly vehicle warning sign of claim 2, wherein the heating element forms a border of the reflective material on an outside of each of the rectangular areas.

4. The sensor-friendly vehicle warning sign of claim 1, wherein control signals for one or more active elements of the sensor-friendly vehicle warning sign are integrated with a hazard light control, for automatically activating the one or more active elements upon a hazard-lights operating mode being active.

5. The sensor-friendly vehicle warning sign of claim 1, wherein one or more active elements of the sensor-friendly vehicle warning sign is configured for automatic activation in response to detection of a flat tire or deployment of an airbag.

* * * * *